(12) United States Patent
O'Donnell et al.

(10) Patent No.: US 7,437,203 B2
(45) Date of Patent: Oct. 14, 2008

(54) REMOTE TERMINAL UNIT ASSEMBLY

(75) Inventors: Graham O'Donnell, Dublin (IE); Morgan Sheehy, Dublin (IE); Adrian Kearney, Dublin (IE)

(73) Assignee: Viserge Limited, Dublin (IE)

( * ) Notice: Subject to any disclaimer, the term of this patent is extended or adjusted under 35 U.S.C. 154(b) by 0 days.

(21) Appl. No.: 10/947,781

(22) Filed: Sep. 23, 2004

(65) Prior Publication Data
US 2005/0216107 A1    Sep. 29, 2005

Related U.S. Application Data

(63) Continuation of application No. 09/548,661, filed on Apr. 13, 2000, now abandoned, which is a continuation-in-part of application No. PCT/IE98/00083, filed on Oct. 13, 1998.

(30) Foreign Application Priority Data

Oct. 13, 1997    (IE)    .................................... S970741

(51) Int. Cl.
| | |
|---|---|
| G05B 19/18 | (2006.01) |
| G05B 9/02 | (2006.01) |
| G06F 1/24 | (2006.01) |
| G06F 9/00 | (2006.01) |

(52) U.S. Cl. ............................. 700/82; 700/2; 700/79; 713/100

(58) Field of Classification Search .................... 700/2, 700/4, 5, 19, 20, 21, 28, 53, 79, 82, 286, 700/95; 706/14; 710/104; 718/104
See application file for complete search history.

(56) References Cited

U.S. PATENT DOCUMENTS 4,672,529 A    6/1987    Kupersmit .................... 700/1

(Continued)

FOREIGN PATENT DOCUMENTS

EP    0810555 A2    12/1997

(Continued)

OTHER PUBLICATIONS

Carrapatoso, A., Gomes, F. "High Performance Telecontrol Remote Unit". ISIE '97 vol. 1 (Jul. 1997): 99-102.*

(Continued)

*Primary Examiner*—Ryan A Jarrett
(74) *Attorney, Agent, or Firm*—Jacobson Holman PLLC

(57) ABSTRACT

A construction of RTU assembly having a number of independently operational cells for systems functions is provided. Each cell is formed from a configurable component and effectively could be of the same construction as a conventional RTU that would be used for a particular function. There is inter-cell communication for the continuous downloading of information between cells. Ideally the information is controlled in such a way that each cell is aware of all the information that is being transferred, but only receives that information that it requires. In this way all the functions can be performed and the cells operate as equal peers and no one cell has priority over the other cells, such that the failure of one cell will cause the failure of all the others. There can be duplication of function in the cells and various "redundancy" of power, and I/O ports is built into the system.

39 Claims, 3 Drawing Sheets

U.S. PATENT DOCUMENTS

| | | | |
|---|---|---|---|
| 5,179,376 A * | 1/1993 | Pomatto | 340/870.02 |
| 5,485,142 A | 1/1996 | Stute et al. | 340/506 |
| 5,517,423 A | 5/1996 | Pomatto | 700/286 |
| 5,966,304 A | 10/1999 | Cook et al. | 700/82 |
| 5,984,498 A | 11/1999 | Lem et al. | 700/2 |
| 6,018,449 A | 1/2000 | Nelson et al. | 361/66 |
| 6,047,222 A | 4/2000 | Burns et al. | 700/79 |
| 6,529,857 B1 | 3/2003 | O Donnell et al. | 702/188 |
| 6,725,106 B1 * | 4/2004 | Covington et al. | 700/82 |

FOREIGN PATENT DOCUMENTS

| | | |
|---|---|---|
| WO | WO91/00570 | 1/1991 |

OTHER PUBLICATIONS

G. T. Heng, Microprocessors and Microsystems 20, "Microcomputer-based remote terminal unit for a SCADA . . .", pp. 39-45, 1996.

* cited by examiner

REMOTE TERMINAL UNIT ASSEMBLY

This application is a continuation of U.S. application Ser. No. 09/548,661 filed on Apr. 13, 2000 now abandoned which is a continuation-in-part of PCT application PCT/IE98/00083 filed Oct. 13, 1998 and published in English.

The present invention relates to a remote terminal unit (RTU) assembly RTUs often form part of a control system which generally comprises a master station having a networked communications link with a plurality of RTUs, each associated with one or more separate plant units providing control and monitoring functions for the control system.

For example in a water distribution system for domestic water supplies there is a need to manage the reservoirs, there is a need to manage water treatment and storage, the basic water distribution itself, the waste water collection and subsequently the waste water treatment, which latter may include the whole recycling process, not alone of waste water from domestic use, but also the treatment of sewage. There is thus in effect a large number of pieces of equipment generally hereinafter referred to as plant units, which require both control and monitoring operations to be performed on them from a central master station, or from a plurality of control or master stations. There are major problems in such control systems in that they have to operate with a high degree of availability and they have to be able to accept the addition of new equipment onto the network. The industry is continually facing higher quality standards, whether it be environmental, safety or security. There is also increased demand on the supply and indeed there are the attendant problems of having a large amount of relatively old equipment to which automation systems and controlling units are being applied on a piecemeal basis. The problem is that almost certainly over time, indeed on a regular basis, it is necessary to change or add to several aspects of the operations. The typical life of an automation system in the water distribution industry has been somewhat of the order of 5 years, which is a relatively short period of time within which to have to redesign and change the control system.

Another example is the oil and gas industry, where essentially the same problems are encountered, even though the plant units now involved and the actual control functions are entirely different, being operations such as well monitoring, well testing, flow calculations, control of compressors, explosion suppression, tank storage installations and so on. Not alone are these sites often very remote geographically, but even more importantly they are often inaccessible during certain times of the year simply due to weather conditions. There is thus a need for extremely careful and almost foolproof monitoring, communication and control strategies or functions. These cannot break down as if they do the consequences could be catastrophic in terms of the environment let alone human life.

Similarly in the power distribution industry, there are almost identical problems. Again the plant units may be different in that they are now remote transformer substations, distribution networks, power lines, generating stations and the like. There is also in the power distribution industry the problem of demand which is variable in the sense that the power distribution network has to satisfy customer load requirements, rather than some fixed output. This is much more variable, for example, than in the water distribution environment. The problem is that the industry has to have not alone generation automation, but also substation and transmission and distribution automation, all of which leads to extremely complex protection, control and communication functions.

On a slightly less complex level, substantially the same problems occur within individual plants, for example, a highly automated processing plant such as an oil refinery. Here there is similar needs of monitoring and control to ensure the adequate operation of the plant over time. While it may be easier to replace faulty remote terminal units in a less geographically spread environment than for example with a utilities distribution network, there are still the same problems. This is particularly so if there is a lack of staff and this is a growing worldwide problem as companies more and more try to operate equipment at the lowest possible manning levels.

However, as mentioned above, the problem is even worse with public utility operations, where there has been relatively rapid growth, increasing consumer demands for 100% reliability and in turn pressures on the utility providers to reduce costs and improve efficiencies. As mentioned above, many of the utilities have to operate plant units which are very old and in some cases over 50 years old. Further as the utility companies invest in information systems, the information systems are being made obsolete by developments in the information systems, or requirements for information processing that the previously installed information system cannot accommodate.

All these systems use remote terminal units (RTUs) to monitor and control the operation of the plant units within the system and to ensure that they are correctly controlled. There are many efficient designs of RTUs, however, in large systems they suffer from certain significant defects. Obviously the first effect is to ensure that they are available and that they perform their functions correctly. However, scalability, flexibility with a need to upgrade systems is a major problem.

The traditional design approach for RTU includes the use of a central, main or primary microprocessor as effectively the operating system of the RTU. In some cases additional microprocessors may be used to augment the first processor and perform functions such as input/output to a plant unit. There are certain designs of RTUs that are used extensively, the first and simplest is a main processor having a series of I/O ports. The second type consists of a main microprocessor and then sub-microprocessors each operating with separate I/O ports. As the cost of microprocessors declines, the addition of sub-microprocessors becomes more feasible and undoubtedly this allows increased overall processing capability and some operational advantages. Finally the more recent type of RTU comprises a plurality of sub-microprocessors, each dealing with separate I/O ports which in turn communicate back to a main processor, which can be sited remote from the other sub-processors.

The problem is that all these types of RTUs suffer from the fundamental disadvantage in that there is absolute reliance on the main processor and thus any failure of the main processor causes failure of the whole system. This is particularly apparent in complex applications where performance bottle-necks are common. While processors have become more powerful so too has the complexity of the tasks required to be performed on the plant units. Even RTUs not currently suffering from performance bottlenecks are likely to do so in the future as a result of increased demand.

Furthermore, the functions which these RTUs can perform are inflexible and frequently such RTUs are proprietary and cannot communicate with RTUs from other vendors. As each component of this type of RTU is different, being manufactured as a separate element and configured for a given purpose there are few opportunities to reduce cost through the use of identical components. Additionally, due to the rigid structure it is not possible for RTU suppliers to provide an evolutionary path for Utilities over any reasonable period. While elements such as the main microprocessor can be upgraded the interconnection scheme which links it to sub-processors is frequently age dependent. Linked to this are difficulties associated with using these units, as the main microprocessor has to understand the relationships and interactions between it and its sub-processors. Thus, information must be frequently configured to be directed from one processor to another.

In summary, known architectures are limited in the scale of applications which may be addressed. For example utility companies frequently operate very small substations comprising no more than a few pieces of equipment in the same area as large substations having several thousand pieces of equipment distributed over an area of thousands of square meters. While each of these facilities require the performance of similar functions and it is clearly desirable for the utility company to be able to use the same technology for both. Current solutions are either not cost effective or are technologically undesirable.

The present invention is directed towards overcoming these problems and towards providing an RTU assembly that will be more efficient in use than heretofore.

STATEMENTS OF INVENTION

According to the invention there is provided an RTU assembly comprising:
  at least two independently operational cells for system functions each formed from re-configurable components;
  inter-cell communication means for the continuous downloading of information between cells;
  a data controller having means to provide a unique identifier to each data input to the RTU; and
  acceptor means on each cell to receive data appropriately identified for that cell for subsequent processing.

There are numerous advantages in this. Since each cell is effectively a separably operable RTU, the failure of one cell does not affect the failure of another cell. Further, it is possible to immediately communicate with another cell that there has been a failure and therefore, the other cells can, in many instances, immediately assume the processing function of the now failed cell and the control system would operate in substantially the same manner as before without showing any fault in the system. The control system would continue to operate as before as all the operational functions of control and monitoring would continue to be carried out on these plant units.

Preferably the data controller and the receptor means are formed by a distributed database. The use of a distributed database is particularly advantageous. It is a very efficient database to use and fortunately the database can be held effectively on each cell and thus each cell will have information as to what other cells hold and will also have information as to which information it should take.

Ideally in the RTU assembly according to the present invention a system operational function is assigned to a cell to form a primary cell and at least one additional cell as a back-up cell and in which the primary cell performs the operational function while the back-up cell receives the data until the primary cell falls and the back-up cell assumes the role of a primary cell. The advantage of this is that if any break-down occurs in the cell then another cell immediately takes over the particular function and this function can be for example communications, it could be a particular processing function, it could be inter-cell communications, it could be communications with a master station or any other form of communication. The great advantage is that critical functions can be provided with redundancy. The important point is that the cell that previously was the back-up cell becomes the primary cell and if there is a third back-up cell, it remains as the back-up cell to the new primary cell. Thus, any particular function can be guaranteed to be performed and the failure of a cell will not affect it.

Ideally more than one cell is connected to the same I/O port of a plant unit to which it is connected. The advantage of having this will be immediately apparent. It is a simple matter to wire more than one cell to any I/O port of a plant unit.

Ideally the inter-cell communication means incorporates re-configuration means to change the operational function of a cell and it may incorporate means to transfer to and store instructions in any cell for subsequent re-configuration of that or any other cell. The great advantage of this is that by providing re-configuration means in the multiple RTU, the failure of any cell is quickly obviated by the assumption immediately, by another cell, of the functions being carried out on the plant units by the now failed RTU.

Ideally the cells communicate through dual redundant networks and they may have a dual redundant power supply. There are obviously advantages in this but because the RTUs are being grouped as cells within this multiple RTU, the provision of such redundancy is relatively easily achieved.

Ideally each cell comprises a data device for storing information relating to the functional operation of other cells in the multiple RTU. The advantage of this is that each cell has full knowledge of the operational functions and requirements of any other cell. Thus, the maximum knowledge is provided.

Finally the invention provides a control system incorporating an RTU assembly of the type hereinbefore described.

DETAILED DESCRIPTION OF THE INVENTION

The invention will be more clearly understood from the following description of some embodiments thereof, given by way of example only described with reference to the accompanying diagrammatic drawings in which.

In this specification, the term "cell" is used to identify any unit, or indeed any part of a unit which is a re-configurable operating component. Essentially such a unit or cell could be in all respects a stand alone RTU. There is strictly speaking no limitation on what a cell can be. Generally a cell will contain a microprocessor or a number of microprocessors which usually have a power supply, I/O ports, the processors may also have a memory and generally perform various operations on receipt of a signal from a plant I/O port to which they are connected, as well as delivering signals to the plant unit to cause the plant to operate in a particular manner which control functions can in turn be a function of the receipt of commands from a central master control unit, or could, for example, be in response to a signal received from another RTU, or indeed in response to a signal received from the same plant unit, or a different plant unit. Thus, any reference to an RTU, or cell has to be given the broadest possible interpretation and similarly any reference to function can include any systems operational function such as communications, automation, monitoring, data logging, control and so on.

As will become apparent from reading this specification, the essential feature of the invention is the management or control of the data received by the RTU assembly according to the invention which may be data on the operational behaviour of an item of equipment, data from another remote terminal, controller or other instructions inputted by a master station, or by a user or operator. The term "data" has no limitation in this specification, but it can be used to encompass any input to an RTU. The essential feature of the invention as will become apparent hereinafter is that the data is handled to ensure that all the cells have made available to them all the data inputted to the RTU and then it is arranged that the cell only receives that data that it requires to carry out the functions allocated to it and whatever other data it may require. There are two types of functions, control and system functions.

Figure 1:
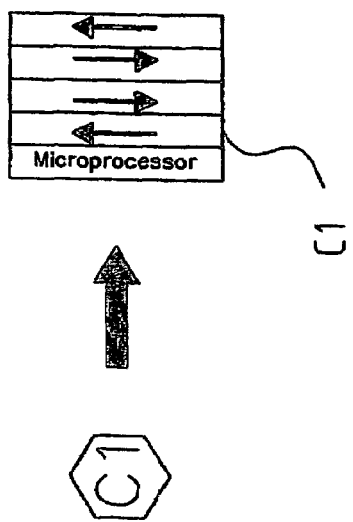
FIG. 1 illustrates in the manner of the present invention and in more conventional manner a diagrammatic representation of an operational cell used in the invention.

FIG. 1 illustrates in conventional manner an independently operated cell in two formats, namely as a six-sided cell and identified by the reference letter C1 and in conventional manner again identified by the reference C1 and incorporating a microprocessor and I/O ports for plant interface to all intents what would conventionally be called an RTU if used on its own.

Figure 2:
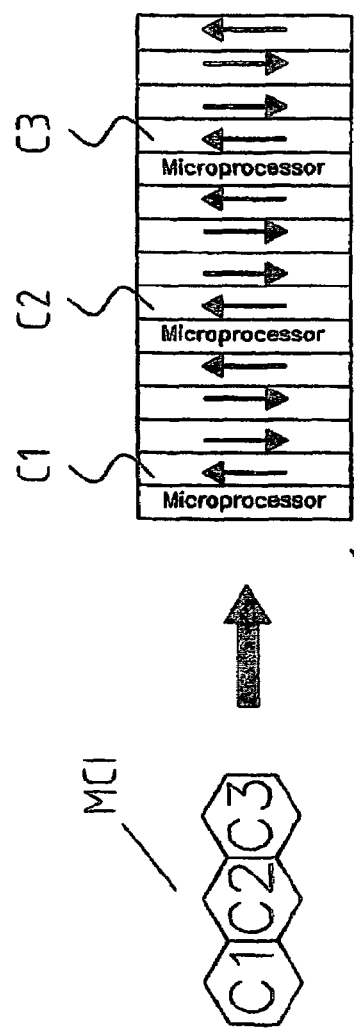
FIG. 2 illustrates in the manner of the invention and more conventionally three cells forming an RTU assembly according to the invention.

FIG. 2 shows an RTU assembly according to the present invention comprising three cells C1, C2 and C3 linked together, again these are by an inter-cell communication means, which is not illustrated separately but is simply shown by the contact between the three cells C1, C2 and C3. This RTU assembly is identified by the reference MC1.

Figure 3:
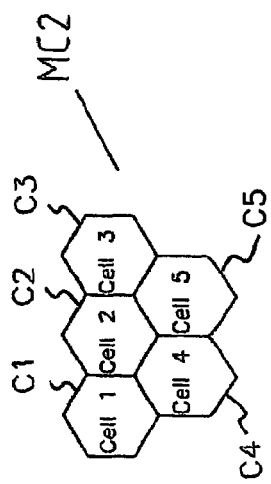
FIG. 3 illustrates diagrammatically five cells forming the one RTU assembly according to the invention.

FIG. 3 illustrates in the same form five cells C1, C2, C3, C4 and C5 combining together to form an RTU assembly identified by the reference MC2.

Figure 4:
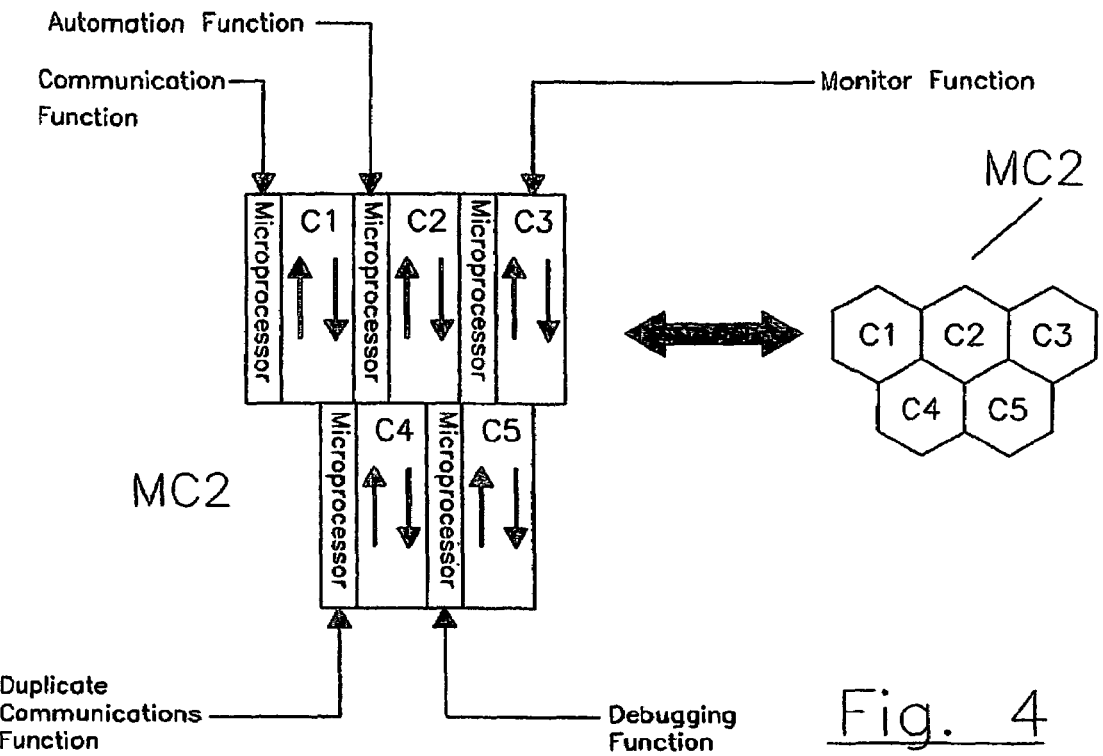
FIG. 4 illustrates diagrammatically the functions assigned to the RTU assembly of FIG. 3.

Referring now to FIG. 4 the RTU assembly MC2 is illustrated showing how cell C1 has a communication function handled by its microprocessor, cell C2 has the automation function, cell C3 has a monitoring function cell C4 has a duplicate communications function and cell C5 has a debugging function.

Figure 5:
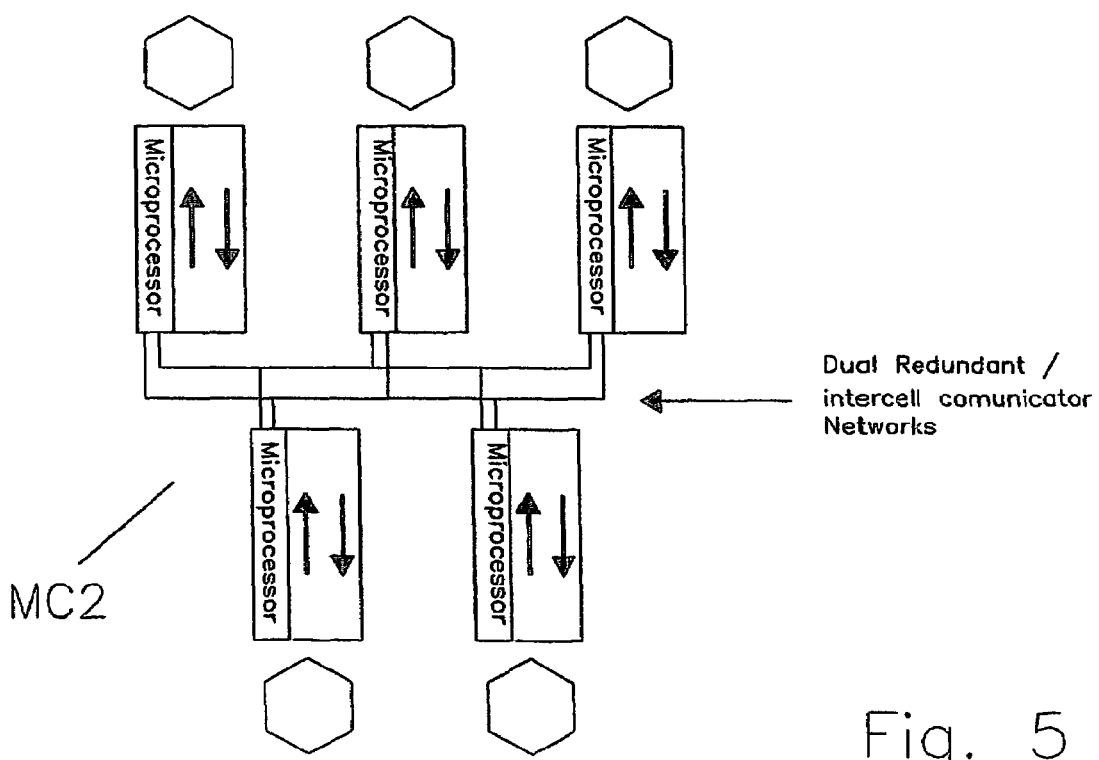
FIG. 5 illustrates inter-cell communications for the RTU assembly of FIGS. 3 and 4.

FIG. 5 illustrates the RTU assembly MC2 illustrating dual redundant inter-cell communications.

As has been mentioned already, the essential feature of the invention is the management or control of the data received by the RTU. This is provided by general control means and can preferably be divided up into a data controller having means to provide a unique identifier to each data input to the RTU and acceptor means on each cell to receive data appropriately identified for that cell for subsequent processing. This is achieved in accordance with the invention by the use of a distributed database, but many other means could be used. The distributed database stores the system functions and control functions. A software program is available to implement these functions. The software program will depend on the complexity of the function to be carried out and the hardware of each cell.

Figure 6:
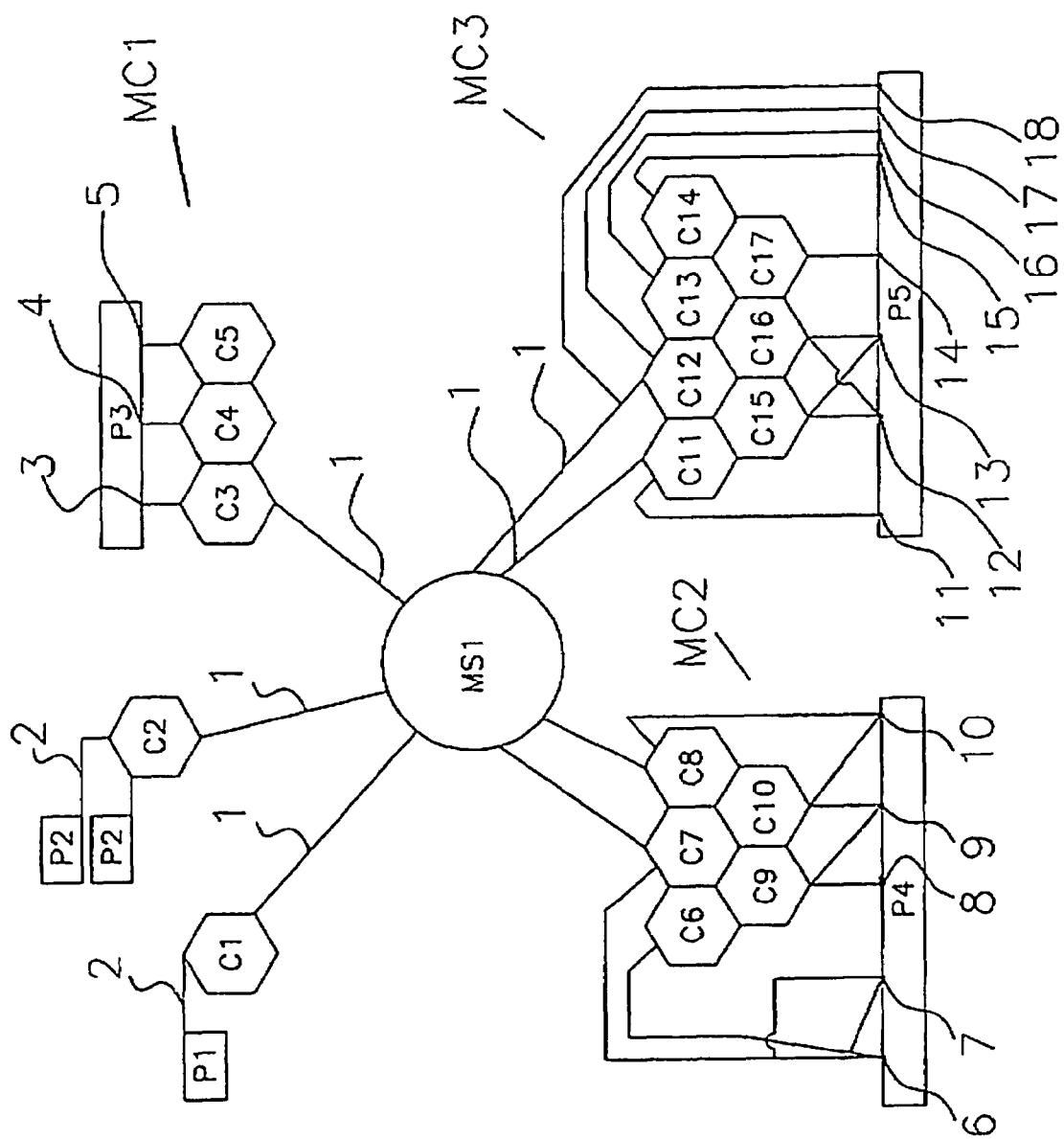
FIG. 6 illustrates diagrammatically a control system using RTU assemblies according to the invention.

Referring now to FIG. 6 there is illustrated a control system comprising a master station identified by the reference numeral MS1 having master communication links with a number of RTUs namely two single cell RTUs C1 and C2 and three RTU assemblies MC1, MC2 and MC3. The master communications link is identified in each case by the reference numeral 1. Each of the RTUs C1, C2, MC1, MC2 and MC3 are in turn connected to plant units and their I/O ports, or plant interface modules by normal communication links which could be for example direct plug-in, identified by the reference numeral 2. The plant units are in turn identified successively by the reference P1, P2, P3, P4 and P5. The I/O ports of the plant unit P3 are identified by the reference numerals 3, 4 and 5. The I/O ports of the plant unit P4 are identified by the reference numerals 6 to 10 inclusive and the I/O ports of the plant unit P5 are identified by the reference numerals 11 to 18 inclusive.

The inter-cell communications link is not identified between the cells of the RTU assemblies MC1, MC2 and MC3 and may be either single inter-cell communications links as illustrated, for example, in FIG. 4, or dual redundant inter-cell communication links as illustrated in FIG. 5. However, for simplicity these are not shown. Thus, it will be seen very simply from the drawing that the master station MS1 is connected in conventional manner to two of the RTUs C1 and C2 and then is connected by its master communications link 1 with the cell C3 of the RTU assembly MC1. It will be seen that the cells C3, C4 and C5 are each connected to separate I/O ports 3, 4 and 5 respectively of plant unit P3.

Dealing now with the RTU assembly MC2 it will be noted that there are two master communications links between the master station MS1 and respectively with cells C7 and C8. It will be noted that for example, with the RTU assembly MC2 that each cell is connected to more than one set of I/O ports in the plant unit P4. Thus, the cell C6 is connected to the I/O ports 7 and 6 while the cell C7 is also connected to the I/O ports 6 and 7. Thus, there is redundancy of connection to the I/O ports. In this RTU assembly MC2, each I/O port is connected to at least two cells. However, in the RTU assembly MC3 only the I/O ports 12 and 13 are connected to more than one cell, in this case cells C15 and C16. There is thus a multiplicity of connections.

To control the information the distributed database forms, as mentioned already, a data controller having means to provide a unique identifier to each data input to the RTU assembly and receptor means in each cell to receive data appropriately identified for that cell for subsequent processing. The term "data controller" is used in this description for what is essentially a data control function embodied in software. The first thing that the data controller does is that it provides unique identifiers to each data input. This could be a specific unique identifier or could just be a general identifier, in other words, a particular parameter or signal from a plant I/O port would always be identified in the same way. Each cell would have sufficient of the distributed database on it to form acceptor means, again a short hand term for what is essentially a software program. Thus, each cell would have on it a list of the various data that it would be polled with, and it then has the acceptor means to choose the data it requires. For example, if the data was data that had to be used by it to carry out a particular function, that particular function would require that data and therefore that data would be downloaded into the cell and the cell would process the information. Essentially all that is required is that a cell recognise information as it needs and then takes it and that it rejects all other information that it doesn't need.

Where a system operational function is assigned to more than one cell, then one of the cells in effect forms a primary cell and the other additional cell forms a back-up cell, or if there are further additional cells, then they form more back-up cells. The arrangement is such that the primary cell performs the operational functions, while the back-up cell receives the data until the primary cell fails, or until some decision is made to take the primary cell out of service. Effectively then the back-up cell assumes the role of the primary cell, this can all be done in a seamless manner and doesn't require any control function.

As mentioned above, in relation to the question of whether there is dual inter-cell communications means formed by dual redundant inter-cell communication network is not illustrated, nor indeed is the power supply to each cell. Generally the power supply can be either a single power supply, or can include a redundant power supply for added reliability.

It will be appreciated that the inter-cell communication means can download information between cells in an RTU assembly. It will be obvious from the various drawings that separate operational functions for processing within the RTU assembly can be allocated to any particular cell, or that, for example, the same operational function can be allocated to two cells to provide real time redundancy of the carrying out of that function so that you have certain operational functions allocated to more than one cell.

It is also envisaged that a separate I/O module could be provided which would include allocation means for allocating a predetermined I/O port to a specific cell of an RTU assembly according to the present invention.

It will be appreciated that in some instances a cell will not be able to carry out a whole function, but only part of the function. The present invention can configure a number of cells to carry out parts of the function so that a function is completed.

It will be noted that a master communications link can be formed between at least two cells and the master station. For example, one of the master communications link could be a land based link and the other redundant link could be a radio based link. Thus, for example, in the case of an extreme emergency caused by an earthquake or the like, the radio link would still operate to provide the necessary control.

It is envisaged that the inter-cell communication means would incorporate re-configuration means to change the operational function of any cell, depending on whether that particular cell indicates a malfunction or some other cell indicates a malfunction.

It will be appreciated that the re-configuration means could incorporate means to transfer to and store instructions in any cell for subsequent re-configuration of that or any other cell. Ideally the re-configuration means would incorporate means to transfer operational functions allocated to a cell to another cell on sensing malfunction of a cell.

One of the major features of the present invention is the provision of redundant communication networks, power supplies and the like. It is also envisaged that since all the cells will include a memory function that there will be provided means for storing information relating to the functional operation of other cells in each cell forming part of the RTU assembly.

It will be appreciated that for any particular cell forming the RTU assembly a wide variety of I/O modules may be used to allow each cell to be optimised for the plant unit with which it is interfacing.

It will be appreciated that a most important feature of the present invention is the replacement of a controlling processor with a number of processors, each assigned an appropriate task or function, or group of functions within the overall operation of the RTU assembly.

It will be appreciated that, for example, when an RTU assembly is required to perform additional tasks that additional cells may be added to the RTU assembly. When additional cells are added all that is required is that the correct communications protocol be loaded, if it is not already loaded on the new cell or RTU to ensure that inter-cell communications can be provided. Thus, the cells do not have to have the same construction, but merely need to be similar and in any event no particular cell forms the principal processor, therefore at any stage cells can be taken in or out of the RTU assembly and similarly the functions can be altered between individual cells.

There are considerable advantages in this that might not be immediately apparent. It means, for example, that when a new individual cell is added that all the processing power of that cell which could be a powerful processor in its own right is then available to the RTU assembly. Thus, for example, when choosing a new piece of equipment whose cell will have to be added to the RTU assembly, it is possible to ensure that the memory on the new cell is sufficient to allow for example upgrading, or the performance of other functions on the RTU assembly which are being performed by other cells at present. This also allows that new cells with later technology can be added to old cells, thereby overcoming a major problem of technological aging which occurs in many such control systems. By adding cells to an RTU assembly it will often allow cells which would not be capable of performing the desired function the plant to then transfer some of the functions required to be performed to other cells so that the RTU assembly will perform all these functions. Thus, even older plants with RTU assemblies that are not sufficient to perform the necessary functions cells can be added to the system, because the individual cell can be added to the RTU assembly to enable it to perform the additional functions.

Because there is inter-cell communication, the failure of one cell can be irrelevant, similarly when there is the failure of the master communications link because the communication function can be either previously allocated to another cell to provide immediate redundancy, or can be subsequently downloaded onto another cell by the RTU assembly itself, the problem of the master communications link with the master station can be effectively eliminated.

It will be appreciated that each cell can be programmed to continually update the status, data requirements and system functions being carried out by itself and other cells at pre-set intervals.

Since cells share common characteristics, it makes it possible for any collection of them to be used in any configuration for a given application without prior knowledge or design expertise. Thus, developments and installation costs are significantly reduced.

It will be appreciated from the above that a critical consideration for the operation of the invention is that for a group of cells forming a multiple cell RTU assembly to operate satisfactorily they must have an intimate and accurate knowledge of each other's operation, even though they are individual entities. This is achieved by the inter-cell communications.

It will also be appreciated that because all the cells are intercommunicating and that no particular cell is a principal or controlling cell that any cell can be configured to perform any function or functions and they don't have to be pre-defined, but can be re-allocated at any time. This, in addition to flexibility, ensures that the functions can be distributed evenly throughout the RTU assembly preventing excessive load on any particular cell and also preventing critical functions all being tied up in the one particular cell.

Generally speaking the inter-cell communication means would be conventional dual redundant high speed LANs.

While RTU is the term used in this specification, it will be appreciated that the invention is applicable to any signal processor that performs the functions mentioned.

In the specification the terms "comprise, comprises, comprised and comprising" or any variation thereof and the terms "include, includes, included and including" or any variation thereof are considered to be totally interchangeable and they should all be afforded the widest possible interpretation and vice versa. Further it will be appreciated that the invention may be varied within the scope of the claims.

The invention claimed is:

1. A Remote Terminal Unit (RTU) assembly for controlling a system including plant units each having an Input/Output (I/O) port and carrying out a system function comprising:
   communication means;
   a plurality of cells interconnected by the communication means, each cell comprising:
      a microprocessor;
      a power supply;
      a memory for storage of data; and
      an I/O port for reception and transmission of data from a plant unit of the system and/or other cells;
   each of said cells being programmed to be independently operable to carry out at least part of any function of the system, the system function comprising one or more of communications, automation, monitoring, data logging or control;
   at least some of said cells being programmed to have a data control function to configure and re-configure each cell to perform at least part of different system functions, the data control function having means to transfer to and store instructions in any of the plurality of cells for subsequent reconfiguration of any of the plurality of cells, the data control function having means to reconfigure another cell by transferring instructions from one cell to the other cell so that the other cell performs at least part of another different function of the system and means to transfer the particular function allocated to a cell to another cell on sensing malfunction of the cell such that the other cell performs the same particular function as previously performed by the malfunctioning cell; and
   each of said cells being programmed to enable its data control function to source data from and to make data available to other cells as required.

2. The RTU assembly as claimed in claim 1 comprising a distributed database for storage of system functions and a program for the processing of such functions.

3. The RTU assembly as claimed in claim 1 comprising a distributed database for storage of system functions and a program for the processing of such functions and for the storage of the program to carry out the data control functions.

4. The RTU assembly as claimed in claim 1 comprising a distributed database for storage of system functions and a program for the processing of such functions and for the storage of the system function, if any, being carried out by each cell.

5. The RTU assembly as claimed in claim 1 comprising a distributed database for storage of system functions and a program for the processing of such functions and for the storage of the program to carry out the data control functions and for the storage of the system function if any being carried out by each cell.

6. The RTU assembly as claimed in claim 1 in which the control functions are stored in the memory.

7. The RTU assembly as claimed in claim 1 in which each cell is programmed for continually updating a status, data requirements and system function being carried out by itself.

8. The RTU assembly as claimed in claim 1 in which each cell is programmed for continually updating a status, data requirements and system function being carried out by each other cell.

9. The RTU assembly as claimed in claim 1 in which each cell is programmed for continually updating a status, data requirements and system function being carried out by each other cell and itself.

10. The RTU assembly as claimed in claim 1 in which the data control function is programmed into at least two dedicated cells.

11. The RTU assembly as claimed in claim 1 in which each cell is programmed for a continuous downloading of information to other cells.

12. The RTU assembly as claimed in claim 1 in which the data control function is so programmed that on a cell malfunction occurring it causes all data being inputted to the malfunctioning cell to be sent to another cell or cells and for that other cell or cells to carry out the system function previously carried out by the malfunctioning cell in a seamless manner.

13. The RTU assembly as claimed in claim 1 in which the data control function is programmed to provide a unique identifier for each cell when transmitting data.

14. The RTU assembly as claimed in claim 1 in which each cell is programmed to identify data appropriate for that cell so as to only accept that data for subsequent processing.

15. The RTU assembly as claimed in claim 1 in which more than one cell is connected to the same I/O port of a plant unit.

16. The RTU assembly as claimed in claim 1 in which the communications means incorporates a dual communications network and in which one part of the dual communications networks is redundant except on malfunction of the other.

17. The RTU assembly as claimed in claim 1 in which each cell has a dual redundant power supply.

18. A Remote Terminal Unit (RTU) assembly for controlling a system including plant units each having an Input/Output (I/O) port and carrying out a system function comprising:
   communication means;
   a plurality of cells interconnected by the communication means, each cell comprising:
      a microprocessor;
      a power supply;
      a memory for storage of data; and
      an I/O port for reception and transmission of data to or from a plant unit of the system and/or other cells;
   each of said cells being programmed to be independently operable to carry out at least part of any function of the system, the system function comprising one or more of communications, automation, monitoring, data logging or control;
   at least some of each of said cells being programmed to have a data control function to configure and re-configure each cell to perform at least part of different system functions, the data control function having means to transfer to and store instructions in any of the plurality of cells for subsequent reconfiguration of any of the plurality of cells, the data control function having means to reconfigure another cell by transferring instructions from one cell to the other cell so that the other cell performs at least part of another different function of the system and means to transfer the particular function allocated to a cell to another cell on sensing malfunction of the cell such that the other cell performs the same particular function as previously performed by the malfunctioning cell;
   each of said cells being programmed to enable its data control function to source data from and to make data available to other cells as required; and a distributed database for storage of:
   system functions;
   a program for processing of said system functions;
   a program for carrying out the data control functions; and
   for the storage of the system function, if any, being carried out by each cell.

19. An RTU assembly as claimed in claim 18 in which the data control functions are stored in the memory.

20. The RTU assembly as claimed in claim 18 in which each cell is programmed for continually updating a status, data requirements and system function being carried out by itself.

21. The RTU assembly as claimed in claim 18 in which each cell is programmed for continually updating a status, data requirements and system function being carried out by each other cell.

22. The RTU assembly as claimed in claim 18 in which each cell is programmed for continually updating a status, data requirements and system function being carried out by each other cell and itself.

23. The RTU assembly as claimed in claim 18 in which the data control function is programmed into at least two dedicated cells.

24. The RTU assembly as claimed in claim 18 in which each cell is programmed for the continuous downloading of information to other cells.

25. The RTU assembly as claimed in claim 18 in which the data control function is so programmed that on a cell malfunction occurring it causes all data being inputted to the malfunctioning cell to be sent to another cell or cells and for that other cell or cells to carry out the system function previously carried out by the malfunctioning cell in a seamless manner.

26. The RTU assembly as claimed in claim 18 in which the data control function is programmed to provide a unique identifier for each cell when transmitting data.

27. The RTU assembly as claimed in claim 18 in which each cell is programmed to identifying data appropriate for that cell so as to only accept that data for subsequent processing.

28. The RTU assembly as claimed in claim 18 in which more than one cell is connected to the same I/O port of a plant unit.

29. The RTU assembly as claimed in claim 18 in which the communications means incorporates a dual communications network in which one part of the dual communication networks is redundant except on malfunction of the other.

30. The RTU assembly as claimed in claim 18 in which each cell has a dual redundant power supply.

31. A method of controlling a system including plant units each having an Input/Output (I/O) port and carrying out a system function the control method using an Remote Terminal Unit (RTU) assembly having a plurality of cells communicating with each other, each cell comprising a microprocessor, a power supply, a memory for storage of data and an I/O port for reception and transmission of data from a plant unit of the system and/or other cells comprising the initial steps of:
   allocating at least part of a system function to one or more of the cells, the system function comprising one or more of communications, automation, monitoring, data logging or control; and
   allocating a data control function of configuring or re-configuring the system function carried out by each cell, the data control function transferring and storing instructions in any of the plurality of cells for subsequent reconfiguration of any of the plurality of cells, the data control function having means to reconfigure another cell by transferring instructions from one cell to the other cell so that the other cell performs at least part of another different function of the system and transferring the particular functions allocated to a cell to another cell on sensing malfunction of the cell such that the other cell performs the same particular functions as previously performed by the malfunctioning cell; and
   in which during operation of the method the continuous steps are carried out of:
      operating each cell independently to source data from and to make data available to other cells as required; and
      re-configuring the system function carried out by any cell during operation of the method dependent on control requirements.

32. The method as claimed in claim 31 in which there is compiled a distributed database for storage of:
   system functions;
   a program for processing of said system functions;
   a program for carrying out the data control functions; and
   for the storage of the system function, if any, being carried out by each cell.

33. The method as claimed in claim 31 in which at least two cells are programmed to receive and process the same data for subsequent onward transmission, all of the cells except one of the cells being programmed to reject the data for processing until the cell processing the data ceases to process the data, and on that cell no longer processing the data, one of the other cells will process the data for subsequent onward transmission.

34. A method of controlling a system including plant units each having an Input/Output (I/O) port and carrying out a system function the control method using an Remote Terminal Unit (RTU) assembly having a plurality of cells communicating with each other, each cell comprising a microprocessor, a power supply, a memory for storage of data and an I/O port for reception and transmission of data from a plant unit of the system and/or other cells comprising the initial steps of:
   allocating at least part of a system function one or more of the cells, the system function comprising one or more of communications, automation, monitoring, data logging or control; and
   allocating a data control function of configuring or re-configuring the system function carried out by each cell, the data control function transferring and storing instructions in any of the plurality of cells for subsequent reconfiguration of any of the plurality of cells, the data control function having means to reconfigure another cell by transferring instructions from one cell to the other cell so that the other cell performs at least part of another different function of the system and transferring the particular functions allocated to a cell to another cell on sensing malfunction of the cell such that the other cell performs the same particular functions as previously performed by the malfunctioning cell; and
   in which during operation of the method the continuous steps are carried out of:
      operating each cell independently to source data from and to make data available to other cells as required;
      re-configuring the system function carried out by any cell during operation of the method dependent on control requirements; and
      on replacing a cell of the RTU assembly the system function carried by the replaced cell is allocated to the replacing cell or another cell by reference to a database and the database is updated.

35. The method as claimed in claim 34 in which on a cell malfunctioning the steps are performed of:
- allocating the system function carried by the malfunctioning cell to one or more of the other cells; and
- updating the database.

36. The method as claimed in claim 34 in which each system function is allocated to at least two cells.

37. The method as claimed in claim 34 in which the data control function is allocated to at least two cells whereby a malfunction of a cell does not prevent operation of the data control function.

38. The method as claimed in claim 34 in which each I/O port of a plant unit delivers data to and receives data from at least two cells.

39. The method as claimed in claim 34 in which at least two cells are programmed to receive and process the same data for subsequent onward transmission, all of the cells except one of the cells being programmed to reject the data for processing until the cell processing the data ceases to process the data, and on that cell no longer processing the data, one of the other cells will process the data for subsequent onward transmission.

* * * * *